(12) United States Patent
Chess et al.

(10) Patent No.: US 8,458,694 B2
(45) Date of Patent: Jun. 4, 2013

(54) HYPERVISOR WITH CLONING-AWARENESS NOTIFICATIONS

(75) Inventors: David M. Chess, Mohegan Lake, NY (US); Sean L. Dague, Poughkeepsie, NY (US); Ronald T. Goering, Austin, TX (US); Hidayatullah H. Shaikh, Mohegan Lake, NY (US); Ian N. Whalley, Pawling, NY (US); Steve R. White, New York, NY (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1554 days.

(21) Appl. No.: 11/741,975

(22) Filed: Apr. 30, 2007

(65) Prior Publication Data

US 2008/0271016 A1     Oct. 30, 2008

(51) Int. Cl.
    *G06F 9/455*     (2006.01)
(52) U.S. Cl.
    USPC .......................................................... 718/1

(58) Field of Classification Search
    USPC ............................................................ 718/1
    See application file for complete search history.

(56) References Cited

U.S. PATENT DOCUMENTS

| | | | |
|---|---|---|---|
| 7,356,679 B1* | 4/2008 | Le et al. ............................ | 713/1 |
| 7,421,714 B1* | 9/2008 | Orling et al. .................... | 719/328 |
| 7,606,868 B1* | 10/2009 | Le et al. ........................ | 709/211 |
| 2008/0022032 A1* | 1/2008 | Nicholas et al. .............. | 711/100 |

* cited by examiner

*Primary Examiner* — Mengyao Zhe
*Assistant Examiner* — Brian Chew
(74) *Attorney, Agent, or Firm* — Thomas Grzesik; Fleit Gibbons Gutman Bongini & Bianco PL (57) ABSTRACT

A method, information processing system, and computer readable medium for managing virtual machine imaging. The method includes receiving a request for an imaging operation associated with at least one virtual machine. A notification is sent to at least one operating system associated with the at least one virtual machine of the request for the imaging operation. The operating system is determined to be in a state for the virtual machine to be imaged. The request for the imaging operation is granting in response to determining.

19 Claims, 4 Drawing Sheets

HYPERVISOR WITH CLONING-AWARENESS NOTIFICATIONS

FIELD OF THE INVENTION

The present invention generally relates to the field of information processing systems, and more particularly relates to managing imaging operations for virtual machines.

BACKGROUND OF THE INVENTION

Virtual machine technology, which has been used for decades to divide large mainframe computers into smaller virtual chunks, is becoming increasingly important in distributed IT environments. In particular, many efforts are currently underway to increase equipment utilization, improve performance, and simplify system management, by running server processes in virtual machines of various kinds. One key enabling technology for these improvements is the process of "cloning" a virtual machine to create multiple further virtual machines based on it. Cloning involves first creating an image of a virtual machine by recording the contents of its filesystem(s) and/or memory address space. Then a new virtual machine can be started by making a copy of the recorded image and modifying it as necessary for the environment in which the new virtual machine will run, and starting up a new virtual machine based on the modified copy.

The original virtual machine image and its associated metadata are called a "template", and the process of modifying the template as required for a new environment is called "customization". There are many challenging aspects to template customization. Since most current software artifacts (operating systems, middleware, applications, and so on) were written without virtualization in mind, each piece of software may require different kinds of customization. For instance, it is common for network-aware software to record the hostname of the current machine in a data file in some proprietary format, and to assume that that hostname does not change.

If a virtual machine template is made from a virtual machine that includes such a piece of software, then customizing that template to allow the creation of a virtual machine that can function correctly with a different hostname can require reverse-engineering the software, determining where it stores the hostname, and explicitly patching that file in the template's associated filesystem-image to include the new hostname instead of the old one. Other kinds of customization have analogous problems.

Therefore a need exists to overcome the problems with the prior art as discussed above.

SUMMARY OF THE INVENTION

Briefly, in accordance with the present invention, disclosed are a method, information processing system, and computer readable medium for managing virtual machine imaging. The method includes receiving a request for an imaging operation associated with at least one virtual machine. A notification is sent to at least one operating system associated with the at least one virtual machine of the request for the imaging operation. The operating system is determined to be in a state for the virtual machine to be imaged. The request for the imaging operation is granting in response to determining.

In another embodiment an information processing system for managing virtual machine imaging is disclosed. The information processing system includes a memory and a processor that is communicatively coupled to the memory. The information processing system also includes a virtual machine management module that is communicatively coupled to the memory and the processor. The virtual machine manager is adapted to receiving a request for an imaging operation associated with at least one virtual machine. A notification is sent to at least one operating system associated with the at least one virtual machine of the request for the imaging operation. The operating system is determined to be in a state for the virtual machine to be imaged. The request for the imaging operation is granting in response to determining.

In yet another embodiment, a computer readable medium for managing virtual machine imaging is disclosed. The computer readable medium includes instructions for receiving a request for an imaging operation associated with at least one virtual machine. A notification is sent to at least one operating system associated with the at least one virtual machine of the request for the imaging operation. The operating system is determined to be in a state for the virtual machine to be imaged. The request for the imaging operation is granting in response to determining.

One advantage of the present invention is that an improved hypervisor is provided that notifies components of a virtual machine of an imaging operation request. For example, the hypervisor of the present invention provides one or more signals to the software (operating systems, middleware, and/or applications) that run within the virtual machines that it supports, to notify that software when an image is about to be taken for cloning. The software is then able to take appropriate actions to enable more reliable cloning and customization. The hypervisor of the present invention also provides notifications to the software of a new virtual machine created from a captured image of another virtual machine. These notifications can include parameters such as the IP address and host name of the new virtual machine, address of any system services that the new virtual machine may require, local encryption keys, and the like.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Parallel-Distributed Processing System

Figure 1:
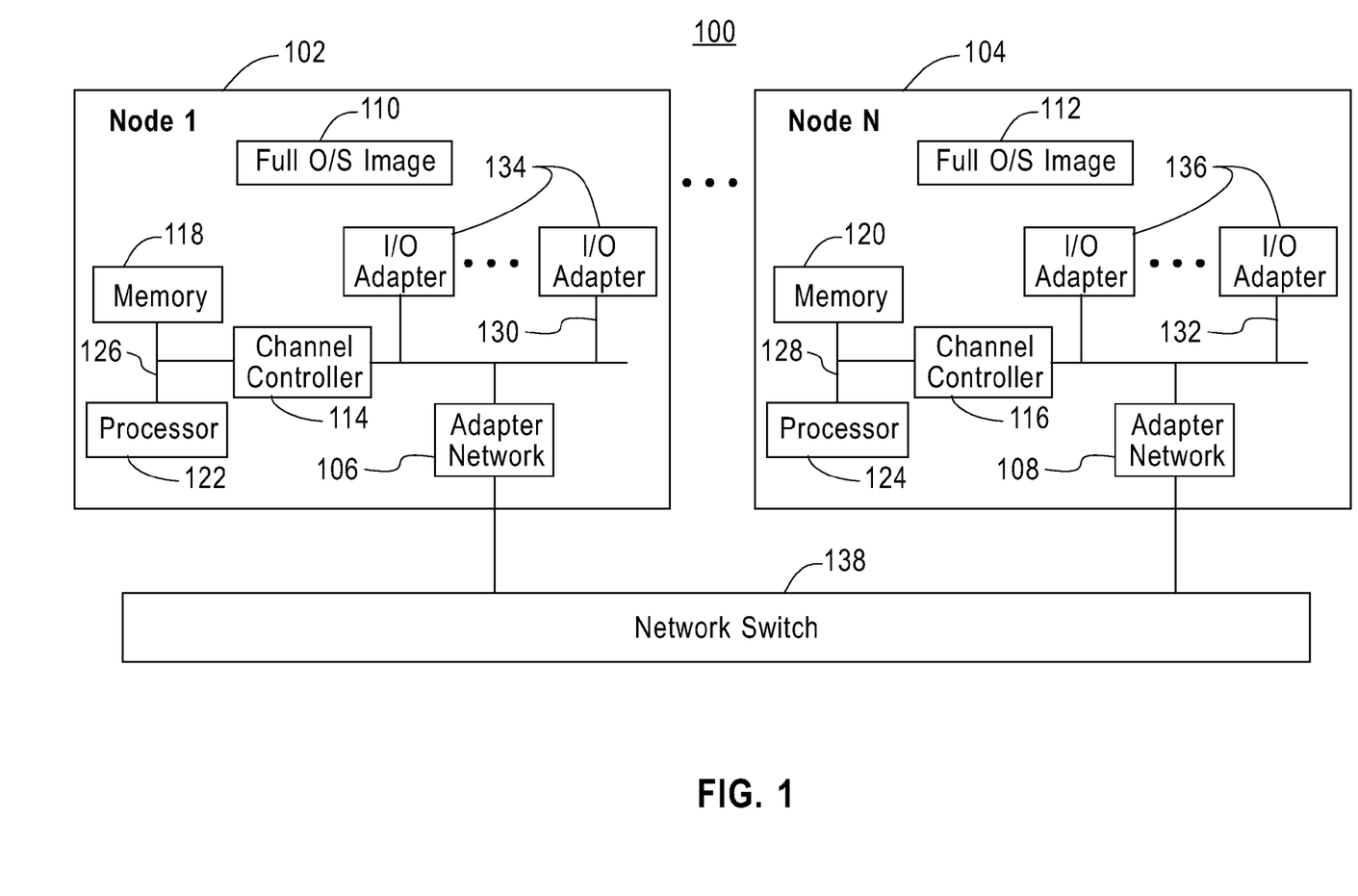
FIG. 1 is a block diagram illustrating an exemplary computing environment according to an embodiment of the present invention.

FIG. 1 shows a distributed processing system 100 in which embodiments of the present invention may be implemented. However, it should be noted that the present invention can also be implemented in non-distributed computing environments as well. In this embodiment, the distributed processing system 100 operates in an SMP computing environment. In an SMP computing environment, parallel applications can have several tasks (processes) that execute on the various processors on the same processing node. The distributed processing system 100 executes on a plurality of processing nodes 102 and 104 coupled to one another node via a plurality of network adapters 106 and 108.

Each processing node 102 and 104 is an independent computer with its own operating system image 110 and 112, channel controller 114 and 116, memory 118 and 120, and processor(s) 122 and 124 on a system memory bus 126 and 128, a system input/output bus 130 and 132 couples I/O adapters 134 and 136 and communication adapter 106, 108. Although only one processor 122 and 124 is shown in each processing node 102 and 104, each processing node 102 and 104 is capable of having more than one processor. Each communication adapter is linked together via a network switch 138. In some embodiments, the various processing nodes 102 and 104 are able to be part of a processing cluster. All of these variations are considered embodiments of the present invention.

Exemplary Information Processing System

Figure 2:
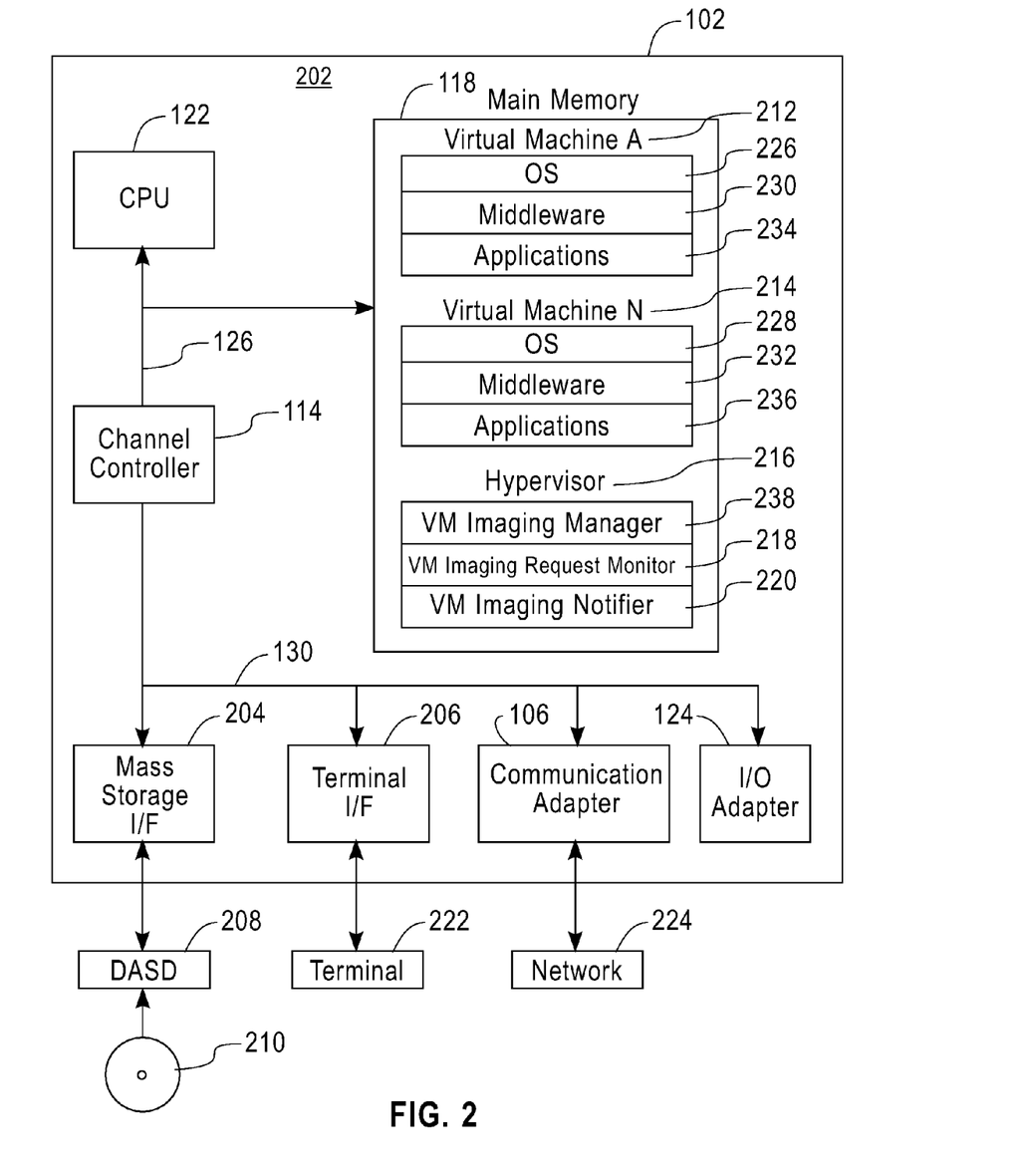
FIG. 2 is a detailed view of an information processing system according to an embodiment of the present invention.

FIG. 2 is a block diagram illustrating a detailed view of an information processing system. In one embodiment, the information processing system of FIG. 2 is a node such as node 102 in the distributed processing system 100 of FIG. 1. Any suitably configured processing system is similarly able to be used as the information processing system 102 in further embodiments of the present invention (for example, a personal computer, workstation, or the like). The information processing system 102 includes a computer 202. The computer 202 includes one or more physical processors 122 that are communicatively coupled to the main memory 118 and the channel controller 114 via the system bus 126. In this embodiment, the main memory 118 is volatile memory such as random access memory ("RAM").

The computer 202 also includes a mass storage interface 204, terminal interface 206, I/O adapter 124, and a communication adapter 106. An input/output bus 130 connects these components. The mass storage interface 204 is used to connect mass storage devices such as data storage device 208 to the information processing system 102. One specific type of data storage device is a computer readable medium such as a Compact Disc ("CD") drive, which may be used to store data to and read data from a CD 210 or DVD. Another type of data storage device is a hard disk configured to support, for example, JFS type file system operations.

Terminal interface 206 is used to directly connect one or more terminals 222 to computer 202 to provide a user interface to the computer 202. These terminals 222, which are able to be non-intelligent or fully programmable workstations, are used to allow system administrators and users to communicate with the information processing system 102. The terminal 222 is also able to include user interface and peripheral devices that are connected to computer 202 and controlled by terminal interface hardware included in the terminal I/F 206 that includes video adapters and interfaces for keyboards, pointing devices, and the like.

The communications adapter 106 provides an interface to the network 224 for implementing data communications with other computers. Such data communications may be carried out, for example, through data communications networks such as IP networks or in any other way. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11 adapters for wireless network communications. Embodiments of the present invention are able to be adapted to work with any data communications connections including present day analog and/or digital techniques or via a future networking mechanism.

The main memory 118 comprises one or more virtual machines 212, 214. A virtual machine, in this embodiment, is a discrete execution environment within a single computer to make the computer function as if it were two or more independent computers. Each virtual machine 212, 214 is assigned all the resources it needs to operate as though it were an independent computer, including processor time, memory, an operating system, and the like. Each virtual machine 212, 214 includes an operating system 226, 228, middleware 230, 232, applications 234, 236, and the like. It should be noted that "virtual machine" includes known virtualization mechanisms such as those provided by the Xen and VMware products, and AIX LPARs that include the entire software stack from the operating system up. In other embodiments, "virtual machine" refers to a container above the operating system level, such as that provided by the Meiosys Metacluster technology.

The operating system 226, 228 is a layer of system software that schedules threads and provides functions for making system resources available to threads, including memory access, access to input/output resources, and the like. The operating system also controls allocation and authorization for access to computer resources. The operating system performs low-level basic tasks such as recognizing input from a keyboard, sending output to a display screen, keeping track of files and directories on a magnetic disk drive, and controlling peripheral devices such as disk drives and printers.

The operating system is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX™, Linux™, Microsoft NT™, AIX™, IBM's i5os, and many others. The middleware 230, 232 is software that connects multiple software applications for exchanging data. Middleware can include application servers, content management systems, web servers, and the like. Applications 234, 236 are any software programs running on top of the middleware 230, 232.

The main memory 118 also includes a hypervisor 216. The hypervisor 216 is a layer of system software that runs under the operating system the virtual machines 212, 214. That is, a hypervisor 224 runs between an operating system 212, 214 and underlying physical computer components including physical processors 122. It is the function of the hypervisor 224, among other things, to manage virtual machines 212, 214. Although only one hypervisor 216 is shown, each virtual machine 212, 214 can include its own hypervisor 216. The hypervisor 216, in one embodiment, includes a virtual machine imaging manager 238 that manages imaging operations associated with virtual machines controlled by the hypervisor 216.

For example, the virtual machine imaging manager 238 includes an imaging request manager 218 that receives requests for imaging one or more virtual machines 212, 214. An image, in one embodiment, can be taken of a virtual machine for cloning the virtual machine at a later point in time. The virtual machine (VM) imaging manager 238, in one embodiment, also includes an imaging notifier 220. The imaging notifier 220, in one embodiment, receives registration requests from system components such as the OS 226, 228, middleware 230, 232, applications 234, 236, and the like to be notified of imaging requests or of newly created virtual machines.

When the VM imaging request monitor 218 receives an imaging request, the imaging notifier provides a notification to the operating system running in the virtual machine associated with the imaging request. In one embodiment, the notification can be a signal in the form of a system interrupt or other known method understood by one of ordinary skill in the art that is appropriate to the hypervisor 216 and OS 226 architectures.

The notification to the OS 226, 228 can include information identifying the nature and properties of the requested imaging operation. Once the OS 226, 228 receives the notification, it can determine whether or not to quiesce so that the system is in a stable state for imaging. If the OS 226, 228 determines that an imaging operation is not acceptable at the present time, the OS 226, 228 notifies the hypervisor 216. The hypervisor 216 then denies the imaging request. One example of when an imaging operation is not acceptable to the OS is when the OS is waiting for a response from a slower I/O device. However, if the OS 226, 228 determines that an imaging operation is acceptable, it quiesces and places the system into a stable state. The hypervisor 216 then determines that the virtual machine 212, 214 is in an acceptable state for an imaging operation and allows the imaging request.

In another embodiment, if the OS 226, 228 determines that the imaging operation is acceptable, the OS forwards the imaging notification from the hypervisor 216 to the middleware 230, 232 and applications 234, 236. The hypervisor 216 can include a list of middleware and applications components within the notification sent to the OS 226, 228 that are registered to be notified of imaging requests. Alternatively, system components can register with the OS 226, 228 itself so that when the OS 226, 228 receives an imaging notification, the notification is forwarded to the registered components. Each notified component then determines if an imaging operation is acceptable. If the operation is not acceptable to a notified component, the hypervisor 216 denies the imaging operation. If however, the notified components determine that the imaging operation is acceptable, the hypervisor 216 allows the imaging operation request.

In another embodiment, when the VM imaging request monitor 218 receives an imaging request, the imaging notifier 220 provides a notification to a plurality of virtual machines running on the same machine or different machines. For example, the imaging notifier 220 sends a notification to each operating system running in the virtual machines associated with the imaging request. Once all of the notified virtual machines reply back that the imaging request is acceptable, the hypervisor allows the imaging request as discussed above. The images taken of virtual machine can either be stored together or separately.

Additionally, the hypervisor 216 can determine that a new virtual machine has been started from a previously-frozen image. The hypervisor 216 acts in a similar fashion discussed above, sending a notification the OS 226, 228, middleware 230, 232 and applications 234, 236. The software components (OS 226, 228, middleware 230, 232 and applications 234, 236) are notified that the virtual machine in which they are currently running has been started from a previously cloned image. The notification can include customization data such as the new IP address and hostname of the new virtual machine, addresses of any system services that the new virtual machine may require, local encryption keys, and the like. The OS 226, 228 forwards the notification to the middleware 230, 232 and applications 234, 236 in the fashion discussed above. Once the notification is received, the components re-determine all the significant facts about the local environment (either from the notification message itself, or by calling system services). The components then modify their own state correspondingly and come out of the quiescent state to resume normal operations.

As discussed above, when a component receives a notification signal, the OS 226, 228 or other software receiving the signal can respond with an exception that causes the pending imaging operation to be aborted or delayed. In another embodiment, the signal is purely advisory, and the recipients cannot respond with any information. In yet another embodiment, the notification signals include query signals that cause the recipients to return information as to how the occurrence of the event impacts their operation. In this embodiment, the components can optionally return suggestions to the hypervisor 216 that indicate a better time to perform the requested imaging operation.

It should be noted that the hypervisor 216 and the virtual machines 212, 214 (and their components) in the example of FIG. 2 are shown in the main memory 118 (e.g., RAM). However, in further embodiments, many components of such software may be stored in non-volatile memory such as the DASD 208, electrically erasable programmable read-only memory space ("EEPROM" or "Flash memory"), RAM drives, and the like. Although the exemplary embodiments of the present invention are described in the context of a fully functional computer system, embodiments are capable of being distributed as a program product via a CD 210 and its equivalents, floppy disk, or other form of recordable media, or via any type of electronic transmission mechanism.

Process of Notifying Virtual Machine Components of an Imaging Request

Figure 3:
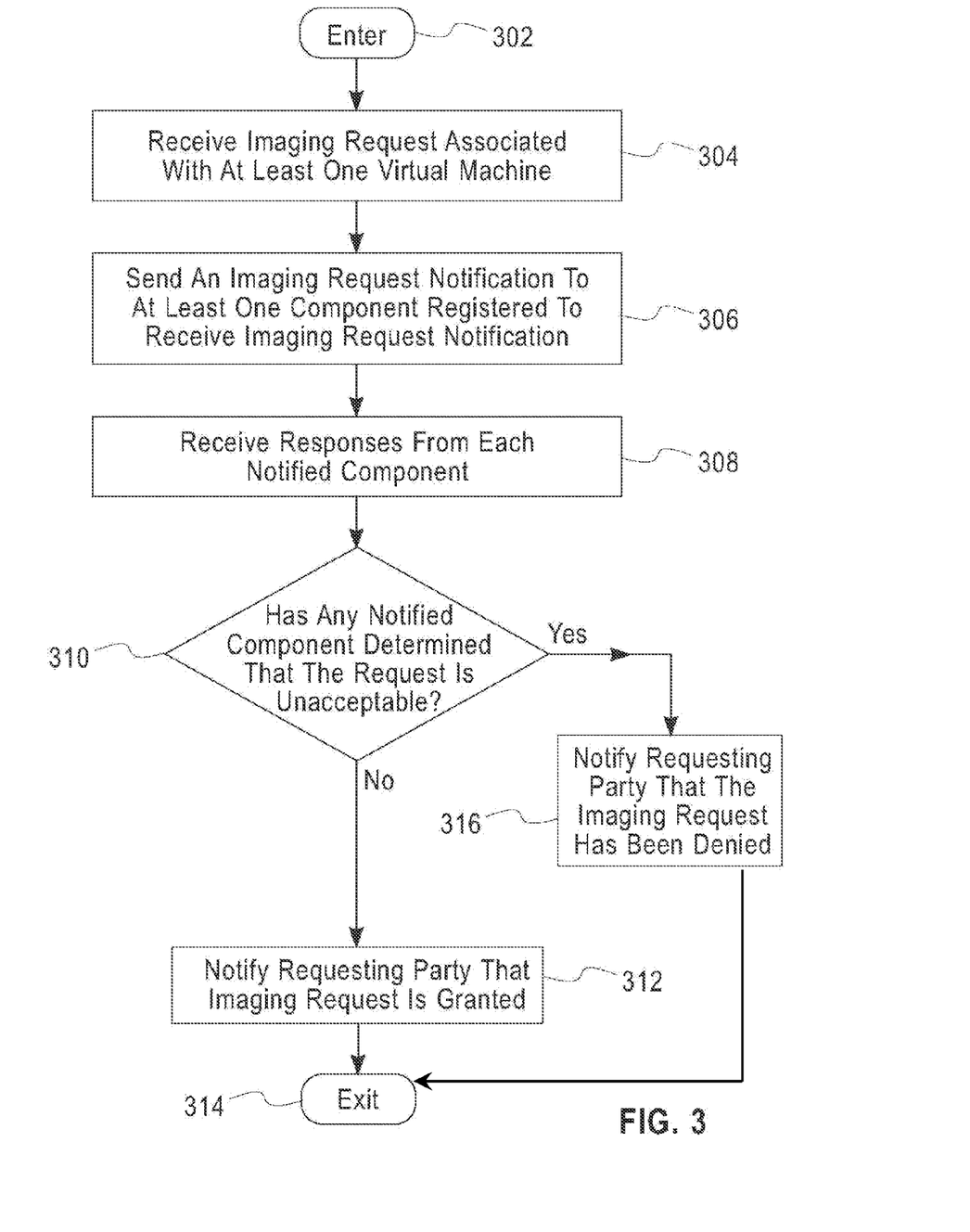
FIG. 3 is an operational flow diagram illustrating an exemplary process of notifying components of a virtual machine of a request imaging operation according to an embodiment of the present invention.

FIG. 3 is an operational flow diagram illustrating a process of notifying components within a virtual machine of an imaging request associated with the virtual machine. The operational flow diagram of FIG. 3 begins at step 302 and flows directly to step 304. The hypervisor 216, at step 304, receives an imaging request associated with at least one virtual machine 212, 214. The hypervisor 216, at step 306, sends an imaging request notification to at least one component of the virtual machine 212, 214. For example, the hypervisor 216 sends a notification to the OS 226, 228 of the virtual machine 212, 214. The hypervisor 216 can also indicate to the OS 226, 226 to forward the notification to other components such as the middleware 230, 232 and applications 234, 236.

The hypervisor 216, at step 308, receives responses back from the notified components. For example, each notified component determines whether it can place itself into a stable state for imaging to occur. The hypervisor 216, at step 310, determines whether any of the received responses indicate that the imaging request is unacceptable. If the result of this determination is negative, the hypervisor 216, at step 312, notifies the party requesting the imaging operation that the request is granted. The control flow exits at step 314. If the result of this determination is positive, the hypervisor 216, at step 316, notifies the party requesting the imaging operation that the request is denied. The control flow exits at step 314.

Figure 4:
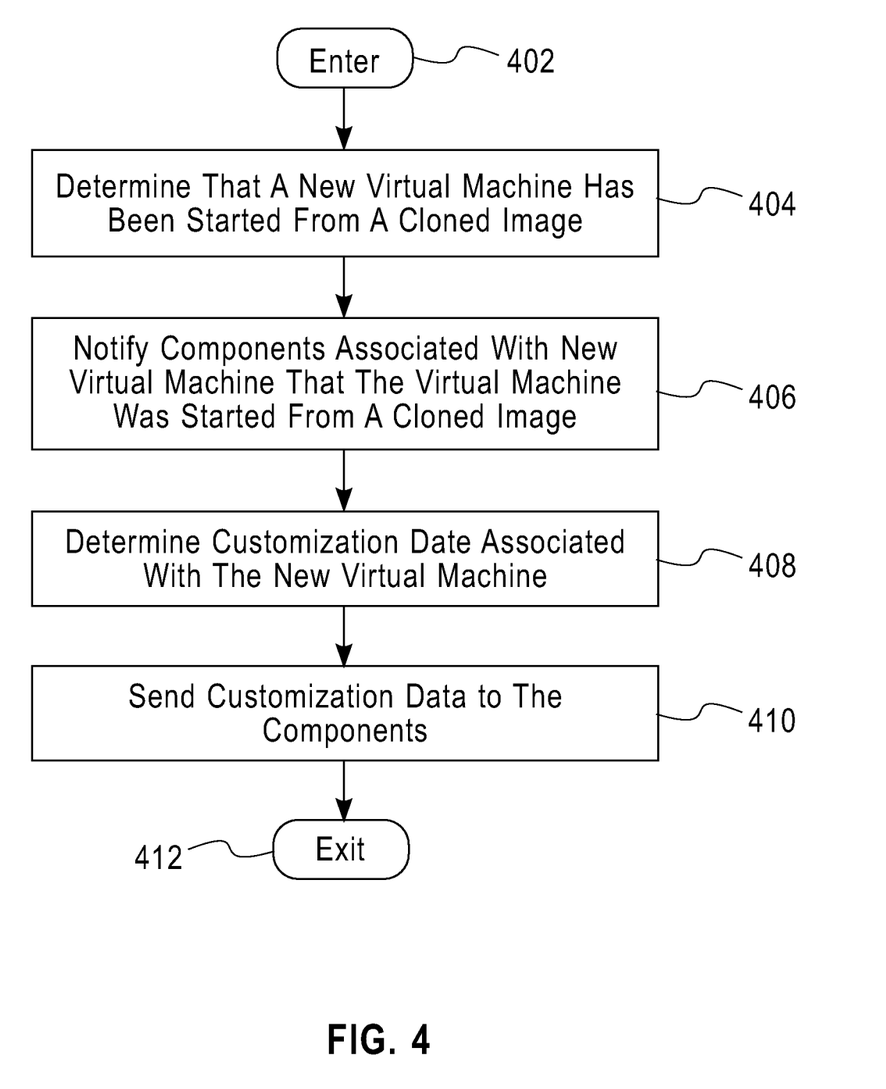
FIG. 4 is an operational flow diagram illustrating an exemplary process of notifying components of a virtual machine that their virtual machine has been started from a cloned image according to an embodiment of the present invention.

Process of Notifying Virtual Machine Components that their Virtual Machine has Been Started from a Cloned Image FIG. 4 is an operational flow diagram illustrating a process of notifying virtual machine components that their virtual machine has been started from a cloned image. The operational flow diagram of FIG. 4 begins at step 402 and flows directly to step 404. The hypervisor 216, at step 404, determines that a new virtual machine has been started from a cloned image. The hypervisor 216, at step 406, identifies the components of the new virtual machine and notifies these components that their virtual machine has been started from a cloned image. The hypervisor 216, at step 408, determines customization data associated with the virtual machine.

The customization data, at step 410, is sent to each notified component. In one embodiment, the notification signal can include the customization data, which can be the new IP address and hostname of the new virtual machine, addresses of any system services that the new virtual machine may require, local encryption keys, and the like. The customization data allows the components to re-determine all the significant facts about the local environment. The components then modify their own state based on the customization data and come out of the quiescent state to resume normal operations. The control flow then exits at step 412.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of managing virtual machine imaging, the method on an information processing system comprising:
   receiving a request for an imaging operation associated with at least one virtual machine;
   sending a notification to at least one operating system associated with the virtual machine of the request for the imaging operation;
   determining, by the operating system prior to any quiescing operation being performed and in response to receiving the notification that has been sent, that the imaging operation is acceptable by the operating system;
   forwarding, by the operating system in response to determining that the imaging operation is acceptable, the notification received to one or more components previously registered with the operating system;
   receiving, in response to the notification forwarded, a response from the one or more components that the imaging operation is acceptable;
   determining, in response to: i) the operating system determining that the imaging operation is acceptable, and ii) receiving the response from the one or more components that the imaging operation is acceptable, that the operation system is in a state for the virtual machine to be imaged; and
   granting, in response to determining that the operation system is in a state for the virtual machine to be imaged, the request for the imaging operation.

2. The method of claim 1, further comprising:
receiving a registration request from at least one component within the virtual machine that is associated with the operating system for being notified of the request for the imaging operation associated with the virtual machine.

3. The method of claim 2, further comprising:
sending, in response to receiving the request for the imaging operation, a notification to the component of the request for the imaging operation.

4. The method of claim 1, wherein the request for the imaging operation is a request to capture an image of the virtual machine.

5. The method of claim 1, wherein a new virtual machine is created from a captured image of the virtual machine created by the imaging operation.

6. The method of claim 1, wherein the determining that the operation system is in a state for the virtual machine to be imaged further comprises:
receiving a notification from the operating system that it is in a stable state.

7. The method of claim 1, further comprising:
determining that the operating system fails to be in a state for where the imaging operation can occur; and
denying, in response to the determining that the operating system fails to be in a state for where the imaging operation can occur, the request for the imaging operation.

8. The method of claim 5, further comprising:
sending, in response to the imaging operation being a request to capture an image of the virtual machine, at least one of the following parameters to the operating system:
an IP address of the new virtual machine;
a host name of the new virtual machine;
at least one system service associated with the new virtual machine; and
at least one local encryption key.

9. An information processing system for managing virtual machine imaging, the information processing system comprising:
a memory;
a processor communicatively coupled to the memory; and
a virtual machine manger communicatively coupled to the memory and the processor, wherein the virtual machine manager is configured to:
receive a request for an imaging operation associated with at least one virtual machine;
send a notification to at least one operating system associated with the virtual machine of the request for the imaging operation;
determine, by the operating system prior to any quiescing operation being performed and in response to receiving the notification that has been sent, that the imaging operation is acceptable by the operating system;
forward, by the operating system in response to determining that the imaging operation is acceptable, the notification received to one or more components previously registered with the operating system;
receive, in response to the notification forwarded, a response from the one or more of components that the imaging operation is acceptable;
determine, in response to: i) the operating system determining that the imaging operation is acceptable, and ii) receiving the response from the one or more components that the imaging operation is acceptable, that the operating system is in a state for the virtual machine to be imaged; and
grant, in response to the operating system being determined to be in a state for the virtual machine to be imaged, the request for the imaging operation.

10. The information processing system of claim 9, wherein the virtual machine manager is further configured to:
receive a registration request from at least one component within the virtual machine that is associated with the operating system for being notified of the request for the imaging operation associated with the virtual machine.

11. The information processing system of claim 10, wherein the virtual machine manager is further configured to:
send, in response to the request for the imaging operation being received, a notification to the component of the request for the imaging operation.

12. The information processing system of claim 9, wherein the virtual machine manager is further configured to determine that the operating system is in a state for the virtual machine to be imaged by:
receiving a notification from the operating system that it is in a stable state.

13. The information processing system of claim 9, wherein the virtual machine manager is further configured to:
determine that the operating system fails to be in a state for where the imaging operation can occur; and
deny, in response to the operating system failing to be in a state for where the imaging operation can occur, the request for the imaging operation.

14. A non-transitory computer readable storage medium for managing virtual machine imaging, the non-transitory computer readable storage medium comprising instructions for:
receiving a request for an imaging operation associated with at least one virtual machine;
sending a notification to at least one operating system associated with the virtual machine of the request for the imaging operation;
determining, by the operating system prior to any quiescing operation being performed and in response to receiving the notification that has been sent, that the imaging operation is acceptable by the operating system;
forwarding, by the operating system in response to determining that the imaging operation is acceptable, the notification received to one or more of components previously registered with the operating system;
receiving, in response to the notification forwarded, a response from the one or more of components that the imaging operation is acceptable;
determining, in response to: i) the operating system determining that the imaging operation is acceptable, and ii) receiving the response from the one or more components that the imaging operation is acceptable, that the operating system is in a state for the virtual machine to be imaged; and
granting, in response to determining that the operating system is in a state for the virtual machine to be imaged, the request for the imaging operation.

15. The non-transitory computer readable storage medium of claim 14, further comprising instructions for:
receiving a registration request from at least one component within the virtual machine that is associated with the operating system for being notified of the request for the imaging operation associated with the virtual machine.

16. The non-transitory computer readable storage medium of claim 15, further comprising instructions for:
   sending, in response to receiving the request for the imaging operation, a notification to the component of the request for the imaging operation.

17. The non-transitory computer readable storage medium of claim 14, wherein the instructions for determining that the operating system is in a state for the virtual machine to be imaged further comprise instructions for:
   receiving a notification from the operating system that it is in a stable state.

18. The non-transitory computer readable storage medium of claim 14, further comprising instructions for:
   determining that the operating system fails to be in a state for where the imaging operation can occur; and
   denying, in response to the determining that the operation system fails to be in a state for where the imaging operation can occur, the request for the imaging operation.

19. The non-transitory computer readable storage medium of claim 14, further comprising instructions for:
   receiving, in response to sending the notification to the operating system, an impact metric from the operating system, wherein the impact metric represents an effect of the imaging operation on the operating system if the imaging operation is to occur.

* * * * *